US007023568B2

(12) United States Patent
Tsunekawa

(10) Patent No.: US 7,023,568 B2
(45) Date of Patent: Apr. 4, 2006

(54) IMAGE PROCESSING APPARATUS AND METHOD AND PROGRAM STORAGE MEDIUM

(75) Inventor: Kiyohiro Tsunekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 09/761,646

(22) Filed: Jan. 18, 2001

(65) Prior Publication Data
US 2002/0015171 A1 Feb. 7, 2002

(30) Foreign Application Priority Data
Jan. 27, 2000 (JP) .............................. 2000-018793

(51) Int. Cl.
*G06K 1/00* (2006.01)

(52) U.S. Cl. .................... 358/1.13; 358/1.15; 399/383; 271/298

(58) Field of Classification Search ............... 399/383, 399/377; 358/1.15, 1.16, 1.13; 270/52.03; 271/3.01, 298
See application file for complete search history.

(56) References Cited

U.S. PATENT DOCUMENTS

| 4,330,200 | A | * | 5/1982 | Kikuchi et al. | ............... 355/24 |
| 5,096,184 | A | * | 3/1992 | Maekawa et al. | ........... 271/288 |
| 5,465,947 | A | * | 11/1995 | Okumura et al. | ........ 270/58.18 |
| 5,864,732 | A | * | 1/1999 | Kato | ........................... 399/43 |
| 6,104,498 | A | * | 8/2000 | Shima et al. | ............... 358/1.14 |
| 6,483,604 | B1 | * | 11/2002 | Gerstenberger | ............ 358/1.17 |
| 6,633,396 | B1 | * | 10/2003 | Barry et al. | ............... 358/1.14 |

\* cited by examiner

*Primary Examiner*—King Y. Poon
*Assistant Examiner*—Lucas Divine
(74) *Attorney, Agent, or Firm*—Fitzpatrick, Cella, Harper & Scinto

(57) ABSTRACT

An image processing apparatus for outputting a page image corresponding to print data inputted from an external source has an analyzer for analyzing the print data at the time of outputting the first copy and generating a page image, an image spooler for holding the page image at the time of outputting the first copy, and a page image reading unit for reading out the spooled page image at the time of outputting the second and subsequent copies. Whether the image spooler and the page image reading unit are used or not is discriminated in accordance with the maximum number of sorting page images which can be processed at once by a mechanical sorter and the designated number of print copies.

10 Claims, 12 Drawing Sheets

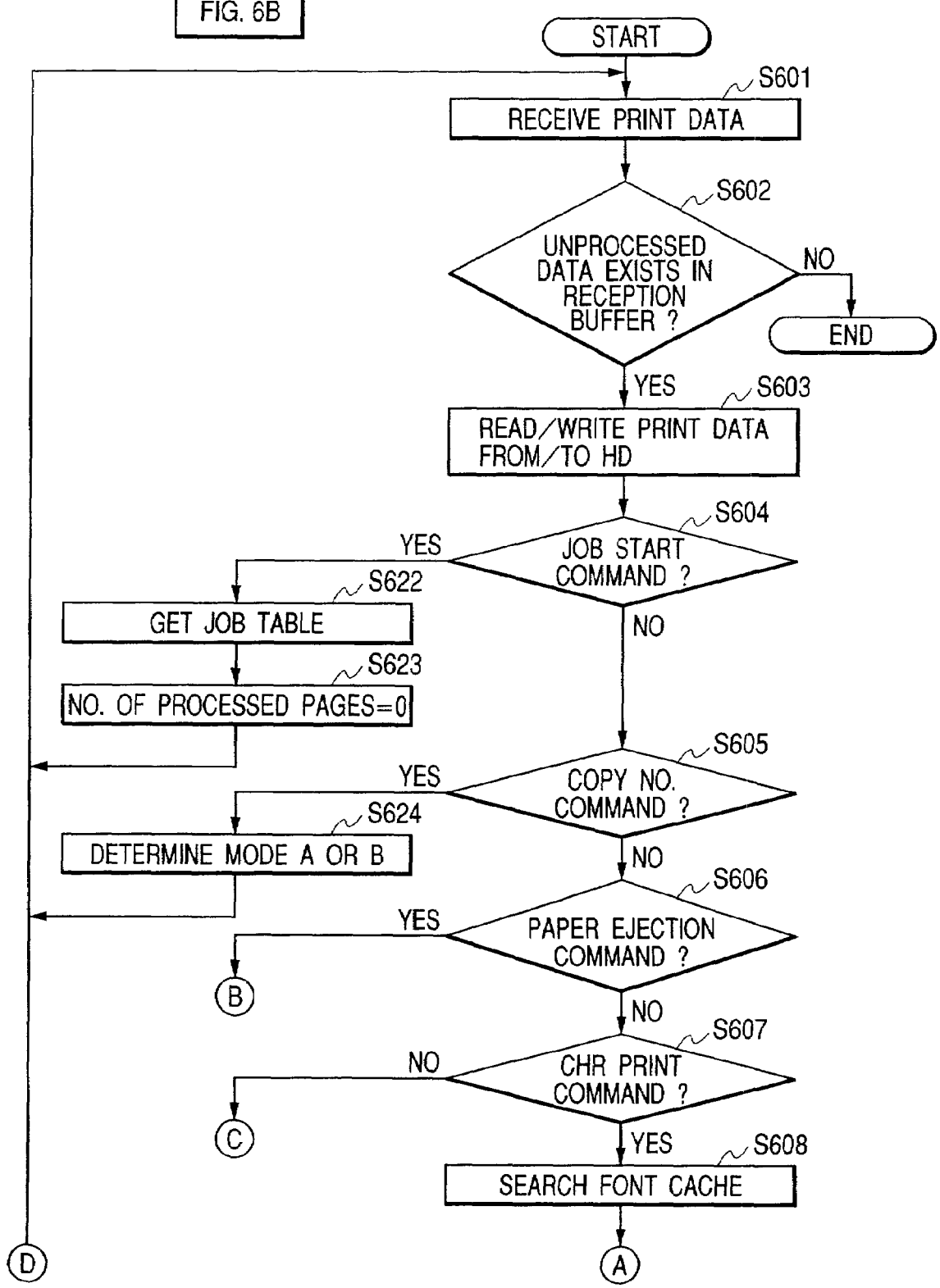

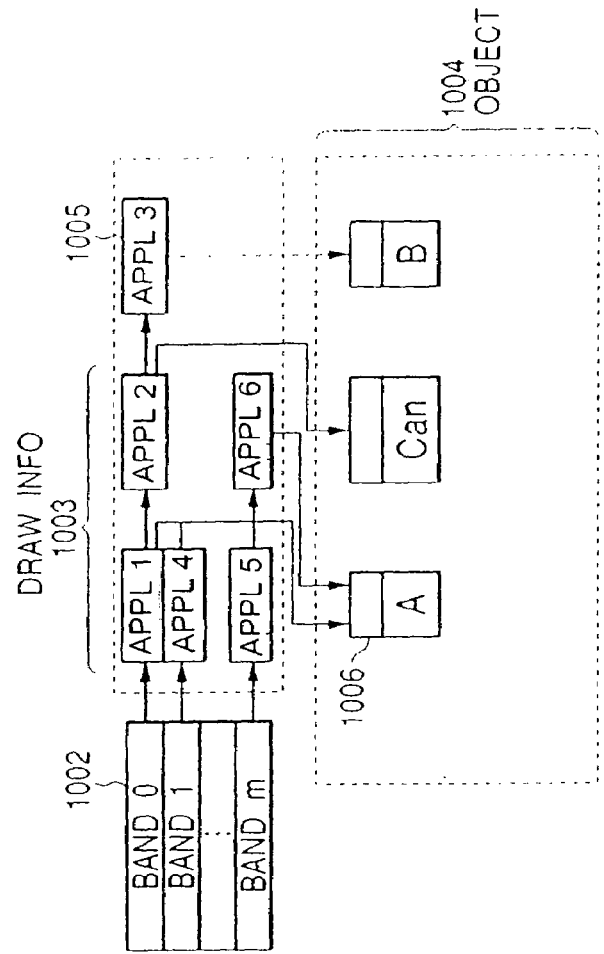
FIG. 10A
FIG. 10B
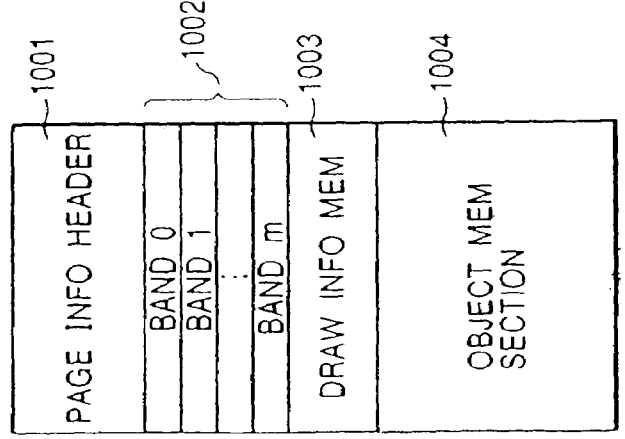
FIG. 10C

IMAGE PROCESSING APPARATUS AND METHOD AND PROGRAM STORAGE MEDIUM

BACKGROUND OF THE INVENTION

1. Field of the Invention

The invention relates to an image processing apparatus, an image processing method, and a program storage medium and, more particularly, to an image processing apparatus, an image processing method, and a program storage medium, in which data can be outputted again on the basis of inputted print data.

2. Related Background Art

In recent years, the realization of high speed printing of a plurality of copies has been a large problem in an image processing apparatus, such as a page printer or the like, which analyzes a print job described by a page description language (hereinafter, abbreviated to "PDL") or the like, and outputs a corresponding page image.

Hitherto, it has been a general application to sort and staple the necessary number of copies by copying the necessary number of sheets, using a copying apparatus, on the basis of an output result derived by a printer. However, the need to output a plurality of copies of an original by a printer is increasing. Also, because the operation has to be performed twice, a picture quality of a copy obtained by the copying apparatus is inferior to that of an original outputted by the printer, and the like.

There are the following conventional methods for processing a plural copy print at a high speed.

The first method is a method whereby only one copy of a print job is transmitted from an external apparatus, such as a host computer or the like. The the print job is spooled into an external storing device such as a hard disk, or the like, equipped on the printer side, and an analysis of a PDL and a print are repeated the same number of times as the designated number of copies. According to the first method, since a data transfer can be accomplished only one copy at a time, it is effective particularly in a case where the apparatus is connected by an interface of a low transfer speed.

In a case where the apparatus is equipped with a mechanical sorter as a finishing apparatus, a plurality of copies can be printed (what is called a page copy) by sequentially outputting respective pages, as many as the number of copies, to different paper ejection bins. For example, when three copies of data (where 1 copy=2 pages) are outputted, first, page 1 is ejected to bins 1 through 3 and page 2 is subsequently ejected to bins 1 through 3. Usually, an intermediate object which is generated by analyzing the PDL data is repetitively rendered the same number of times as the number of copies, thereby outputting the same page. Therefore, it is sufficient to analyze the PDL data once per page. Accordingly, in the plural copy print method using both page copy and a mechanical sorter, engine performance of the printer can be made the most of, as long as it is limited to an output of the same page. Further, since the rendered page data which has been outputted can be also successively erased, a memory can be efficiently used.

The second method is a method whereby a page image (bit map image) rendered at the time of the PDL analysis of the first copy is stored in an external storing device such as a hard disk or the like together with page information indicative of an outputting order or the like and the rendered page image is reused at the time of outputting the second and subsequent copies (the print data of only one copy is received in a manner similar to the first method). According to the second method, the page image is read out from the hard disk and directly shipped to an engine, thereby outputting the second and subsequent copies. According to the second method, since the print data need not be analyzed when the second and subsequent copies are outputted, the page image can be outputted at a high engine speed irrespective of the contents of the print data.

The conventional techniques, however, have problems as will be explained hereinbelow.

That is, according to the first method, since the PDL data is analyzed the designated number of times, particularly, in case of complicated data contents of a heavy analysis load, the page image cannot be outputted at a high speed.

Even in the case where the apparatus has the mechanical sorter, when the total number of copies to be outputted exceeds "the maximum number of copies which can be sorted at once by the sorter", it is necessary to analyze the PDL each time. That is, if (the number of copies=8) is designated for the sorter having seven paper ejection bins, the PDL has to be analyzed twice (the first copy and the eighth copy).

According to the second method, although it is sufficient to analyze the PDL once irrespective of the designated number of copies, an overhead at the time of storing the page image onto the HD or the like upon outputting the first copy occurs. Consequently, there is also a case where the outputting speed becomes contrarily slow in dependence on the data.

SUMMARY OF THE INVENTION

The invention is made in consideration of the above circumstances and it is an object of the invention to efficiently print in consideration of the relation between the number of print copies and a mechanical sorter.

To accomplish the above object, according to the invention, there is provided an image processing apparatus for outputting a page image corresponding to print data inputted from an outside. The apparatus comprises analyzing means for analyzing the print data at the time of outputting a first copy and generating a page image, image spooling means for holding the page image at the time of outputting the first copy, page image reading means for reading out the spooled page image at the time of outputting second and subsequent copies, mechanical sorting means for performing mechanical sorting and paper ejection of each copy, discriminating means for discriminating whether the mechanical sorting means can be used or not and discriminating the maximum number of sorting page images which can be processed at once by the mechanical sorting means, and switching means for, when a plural copy print is designated, discriminating whether the image spooling means and the page image reading means are used or not in accordance with a discrimination result of the discriminating means and the designated number of copies.

The above and other objects and features of the present invention will become apparent from the following detailed description and the appended claims with reference to the accompanying drawings.

BRIEF DESCRIPTION OF THE DRAWINGS

FIGS. 10A, 10B, and 10C are memory maps showing the contents in an object memory 305a of one page, a block diagram showing an outline of a link configuration between draw information/object, and a diagram showing a construction of the draw information.

DETAILED DESCRIPTION OF THE PREFERRED EMBODIMENTS

First Embodiment

The first embodiment of the invention will now be described hereinbelow with reference to the drawings.

Figure 1:
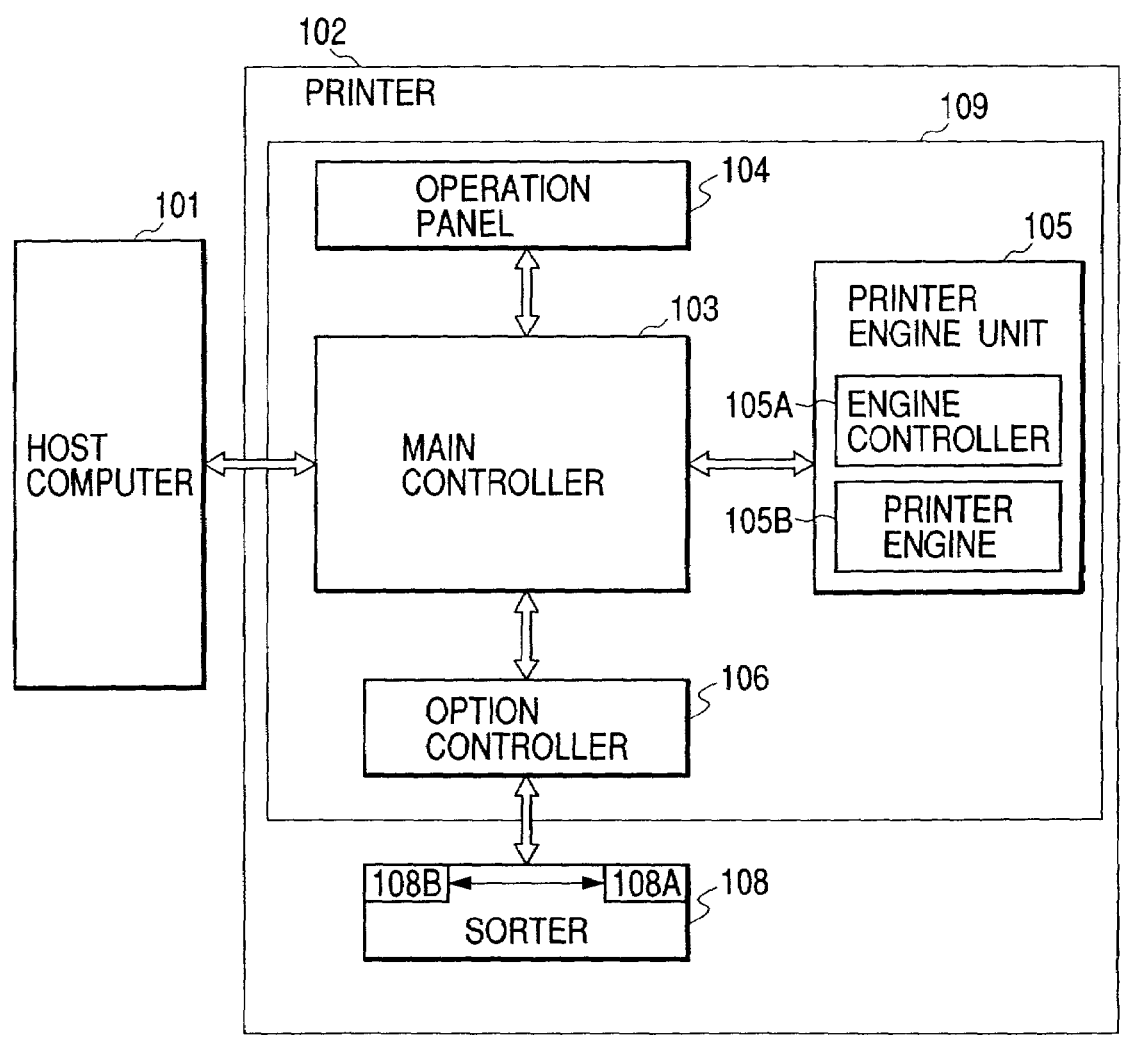
FIG. 1 is a block diagram for explaining a schematic construction of a laser beam printer to which the invention can be applied.

First, a construction of an image processing apparatus suitable for applying the invention will be described with reference to FIGS. 1 and 2. FIG. 1 is a block diagram showing a schematic construction of the image processing apparatus to which the invention can be applied and shows a case of, for example, a laser beam printer. The image processing apparatus to which the invention can be applied is not limited to the laser beam printer but can be also applied to printers of other printing systems. The invention can be applied to any apparatus, irrespective of a difference of equipment constructions, such as a monochromatic printer or a color printer, or the like. Further, the invention is not limited to printers but can also be applied to other equipment, as long as it can execute the functions of the invention.

In FIG. 1, reference numeral 101 denotes external equipment (an external source), such as a host computer or the like, and 102 indicates a laser beam printer main body, to which the embodiment is applied.

The laser beam printer 102 receives print data (character code, figure data, image data, etc.) of a page description language (PDL) format from the host computer 101, generates a corresponding character pattern, figure pattern, or the like in accordance with the print data, and forms an image onto a recording paper (print sheet) as a recording medium. In the laser beam printer, the character pattern can be registered into a data storing unit (not shown), and form data, macro data, and the like can also be registered therein. A page image is generated in accordance with the print data in the storing unit in a manner similar to the print data received from the host computer 101.

Reference numeral 103 denotes a printer control unit (main controller) for controlling a main section of the printer 102 and analyzing the print data (character information or the like), which is supplied from the host computer 101. The main controller 103 is connected to a printer engine unit 105, and also functions as a video controller for generating page information comprising dot data based on the print data and sequentially transmitting the dot data (video signal) to the printer engine unit 105.

The printer engine unit 105 actually forms a latent image onto a photosensitive drum in accordance with the dot data (video signal) and thermally fixes it onto the paper, thereby printing.

Reference numeral 104 denotes an operation panel on which switches for operation, an LED display, and the like are arranged. By operating the operation panel 104, the operator (user) can designate a predetermined operation, or can set print environments or the like of the printer 102.

An option controller 106 has a CPU, a ROM, a RAM, and the like (not shown), and is a controller for integratedly controlling one or more option units on the basis of a paper ejection designation signal or the like, which is transferred from the main controller 103. The option controller 106 communicates with option controller units equipped for various option units through an option unit interface and integratedly controls the various option units.

Reference numeral 108 denotes a paper ejection option unit, for example, a sorter option unit having a sorting function. The paper ejection option unit 108 has a sorter controller 108a therein and executes the sorting operation and paper ejecting operation on the basis of control information which is transmitted from the option controller 106. The sorter controller 108a has a CPU, a ROM, and a RAM (none of which are shown), and the CPU controls the paper ejection option unit 108 on the basis of a program stored in the ROM. Expansion information of the paper ejection option unit 108, for example, information such as the number of paper ejection bins, the presence or absence of the sorting function, and the like is stored in the ROM.

A section 108b having a display unit and various keys is provided for the paper ejection option unit 108. The option unit 108 can display messages to the user, an operating method, and the like, at the time of using each option and operating method.

Although a paper feed option unit such as a sheet cassette of a large capacity can be generally also connected to the option controller 106, it is not shown and its detailed explanation is omitted in the embodiment.

Reference numeral 109 denotes a printer main body unit (printer control unit) comprising the printer engine unit 105 for controlling a printing process, main (video) controller 103, and option controller 106 for integratedly controlling various option units.

Figure 2:
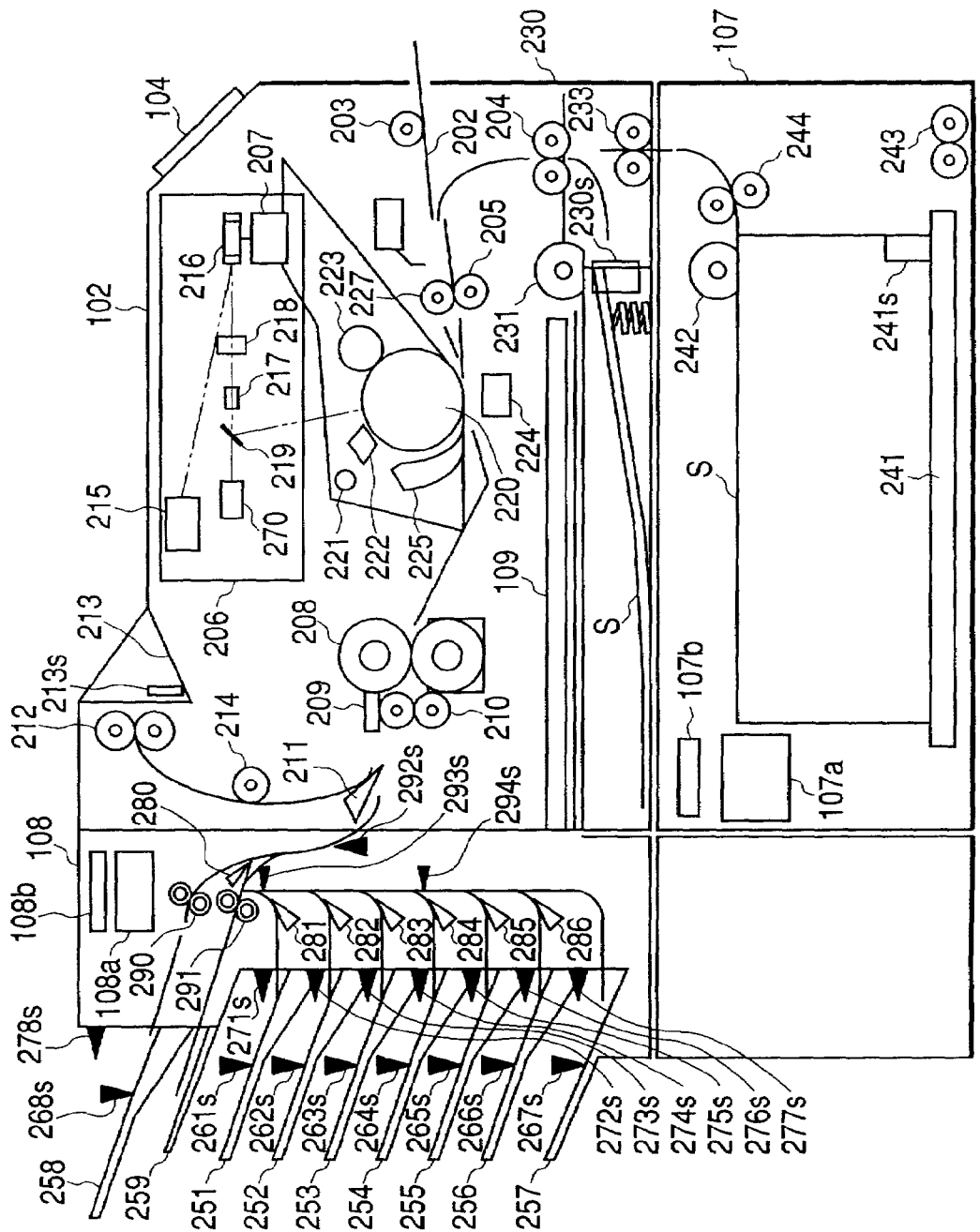
FIG. 2 is a cross sectional view showing an internal structure of the laser beam printer shown in the first embodiment.

FIG. 2 is a cross sectional view showing an internal structure of the laser beam printer 102 to which the invention can be applied and mainly illustrates a construction of the printer engine unit 105 and option units.

The same component elements as those in FIG. 1 are designated by the same reference numerals and their descriptions are omitted here. In the diagram, reference numeral 230 denotes a sheet cassette having a mechanism for holding recording papers (print sheets) S and electrically detecting a size of print sheet S by a partition plate (not shown). Reference numeral 231 denotes a cassette paper feed clutch serving as a cam for separating only a top one of the print sheets S stacked on the sheet cassette 230 and conveying the separated print sheet S by driving means (not shown) to paper feed rollers 204. Each time the print sheet is, fed, the clutch 231 is intermittently rotated, thereby feeding one print sheet in correspondence to one rotation. Reference numeral 230s denotes a print sheet detecting sensor for detecting a quantity of print sheets S held in the sheet cassette 230, and 227 indicates a resist shutter for pressing the sheet and stopping the paper feed. The paper feed rollers 204 convey a front edge portion of the print sheet S to the resist shutter 227. Reference numeral 202 denotes a manual insertion tray for stacking the print sheets S; 203 denotes a manual insertion paper feed clutch for conveying the print sheet S stacked on the manual insertion tray 202 to the resist shutter 227; and 233 denotes option paper feed rollers (paper feed relay conveying rollers) for supplying the print sheet S fed from a paper feed option 107 into the printer 102.

A resist roller pair 205 for synchronously conveying the print sheet S is provided downstream of the manual insertion paper feed clutch 203, cassette paper feed clutch 231, and option paper feed rollers 233. An image recording unit 207 for forming a toner image onto the print sheet S by a well-known electrophotographic process by a laser beam emitted from a laser scanner unit 206 is provided downstream of the resist rollers 205.

In the laser scanner unit 206, reference numeral 215 denotes a laser unit for emitting the laser beam on the basis of an image signal (VDO signal) which is sent from the main controller 103. The laser beam emitted from the laser unit 215 is scanned by a polygon mirror 216, thereby forming a latent image onto a photosensitive drum 220 through an image pickup lens group 218 and a return mirror 219. Reference numeral 217 denotes a beam detector for detecting the laser beam emitted from the laser unit 215 and generating a main scan sync signal. Reference numeral 270 denotes a light amount sensor for detecting a light amount of the laser beam emitted from the laser unit 215.

In the image recording unit 207, reference numeral 222 denotes a primary charging device for uniformly charging the surface on the photosensitive drum 220; 223 denotes a developer which is charged by the primary charging device 222. The latent image which was exposed by the laser beam of the laser scanner unit 206 and formed on the photosensitive drum 220 is developed by the developer 223 using toner. Reference numeral 224 denotes a transfer charging device for transferring the toner image on the photosensitive drum 220 developed by the developer 223 onto the print sheet S which is fed by the resist rollers 205. Reference numeral 225 denotes a cleaner for removing the remaining toner on the photosensitive drum 220, and 221 indicates a pre-exposure lamp for optically deelectrifying the photosensitive drum 220.

Reference numeral 208 denotes a fixing device for thermally fixing the toner image formed on the print sheet S by the image recording unit 207 onto the print sheet S; 210 denotes conveying rollers for conveying and ejecting the print sheet S; 209 denotes a paper ejection sensor for detecting a paper ejecting state of the print sheet S; 211 denotes a flapper for switching the conveying direction of the print sheet S whose recording has been completed to a stacking tray 213 side or the paper ejection option unit 108 side; 214 and 212 denote paper ejection rollers for ejecting the print sheet S which is conveyed by the switching of the flapper 211 onto the tray 213; and 213s denotes a paper ejection stack amount detecting sensor for detecting a stack amount of the print sheets stacked on the tray 213.

An engine controller 105A in the printer control unit 109 controls the electrophotographic process which is executed by the laser scanner unit 206, image recording unit 207, and fixing device 208, and controls conveyance of the print sheet in the printer 102.

Further, the main controller 103 is connected to the external equipment 101 such as a personal computer or the like by a general interface (for example, Centronics, RS232C, USE, etc.), develops image information which is sent through the general interface into bit data, and transmits the bit data as a VDO signal to the engine controller 105A through the video interface.

The various option units detachably connected to the printer main body 109 will now be described.

The option controller 106 shown in FIG. 1 is provided in the printer main body shown in FIG. 2 and can communicate with the various option units by a same protocol through an option unit interface serving as a common bus. The option controller 106 is connected to the main controller 103 through an integrated interface.

Reference numeral 107 denotes the paper feed option unit, such as a paper deck option unit or the like, and its detailed description is omitted here.

In the paper ejection option unit 108 such as a sorter option unit or the like, reference numerals 251 to 257 denote first to seventh paper ejection bins each for performing a face-down paper ejection, sorting the recorded print sheets S, and stacking them. Reference numeral 258 denotes an eighth paper ejection bin for allowing the sheet conveyed into the sorter option to pass straight as it is and performing a face-up paper ejection. Reference numeral 280 denotes a flapper for switching the conveyance of the print sheet S whose direction has been switched by the flapper 211 of the printer 102 and sent to the sorter option unit 108 so as to switch the face-up/down state of the sheet on the basis of an instruction from the main controller 103. Reference numerals 261s to 268s denote paper ejection empty detecting sensors for detecting the presence or absence of the stacked sheets of the print sheets which are ejected to the first to eighth bins 251 to 258, respectively.

Further, paper ejection stack amount detecting sensors 271s to 278s are full stack detecting sensors. At a point when a height of print sheets stacked on each of the first to eighth paper ejection bins 251 to 5258 reaches, for example, 18 mm (corresponding to about 120 sheets) (at a point when each sensor detects it), the sorter controller 108a notifies the main controller 103 of a state where the bin is filled with the print sheets through the option controller 106. About 120 sheets (total about 960 sheets can be stacked onto eight bins) can be stacked onto each of the first to eighth paper ejection bins 251 to 258. Among them, the sort paper ejection can be performed to the first to seventh paper ejection bins 251 to 257.

If a face-up mode is designated by the main controller 103 through the integrated interface, the face-up flapper 280 is turned on to thereby distribute the print sheet. The distributed print sheet S is sent as it is to a paper ejection port by rollers 290. In the case where a face-down mode is designated by the main controller 103 through the integrated interface" the face-up flapper 280 is turned off to thereby distribute the print sheet. The distributed print sheet S is conveyed once until a rear edge of the print sheet S passes beyond the face-up flapper 280, rollers 291 are subsequently reversely rotated, and the print sheet is conveyed to a vertical path from the rear edge of the print sheet S. Bin flappers 281 to 286 are driven at a predetermined timing by the designated paper ejection bins to thereby distribute the print sheet to each face-down paper ejection port. The paper ejection is completed in a face-down state. If the paper ejection bin is the seventh paper ejection bin 257, the paper ejection is performed as it is without driving the bin flappers, thereby completing the face down paper ejection.

Further, if a stapling mode is designated by the main controller 103 through the integrated interface, a stapler (not shown) stacks the print sheets S onto a stapling tray (not shown), arranges the print sheets S, executes the stapling operation, and ejects the sheets to one of the first to eighth paper ejection bins 251 to 258. If a shifting mode is designated by the main controller 103 through the integrated interface, in a manner similar to the case where the stapling mode is designated, the print sheets S are stacked onto the stapling tray (not shown) and arranged, the print sheets S are shifted in a state where they are put on the tray, namely, the stacking position (tray) of the print sheets S to be ejected is shifted, and thereafter, the sheets are ejected to one of the first to eighth paper ejection bins 251 to 258. The apparatus also has a staples remaining amount detecting sensor (not shown), thereby detecting a remaining amount of the staples enclosed in the stapler.

The sorter option unit 108 is controlled by the sorter controller 108a.

The option controller 106, paper deck option unit 107, and sorter option unit 108 are connected by connectors, respectively, and perform serial communication by the option unit interface. Since they are serially connected by the same connector, the paper deck option unit 107 and sorter option unit 108 can be connected by replacing their connecting order.

The resist roller pair 205, paper feed rollers 204, and conveying rollers 244 for conveying the print sheet S are provided downstream of the manual insertion paper feed clutch 203, cassette paper feed clutch 231, and a paper deck feed roller 242, respectively. The image recording unit 207 for forming the toner image onto the print sheet S by the laser beam emitted from the laser scanner unit 206 is provided downstream of the resist roller pair 205. Further, the fixing device 208 for thermally fixing the toner image formed on the print sheet S is provided downstream of the image recording unit 207. The paper ejection sensor 209 for detecting the conveying state of the paper ejecting section, the conveying rollers 210 for conveying the print sheet, the flapper 211 for switching the conveying direction of the print sheet S whose recording has been completed, and the like are provided downstream of the fixing device 208.

Figure 3:
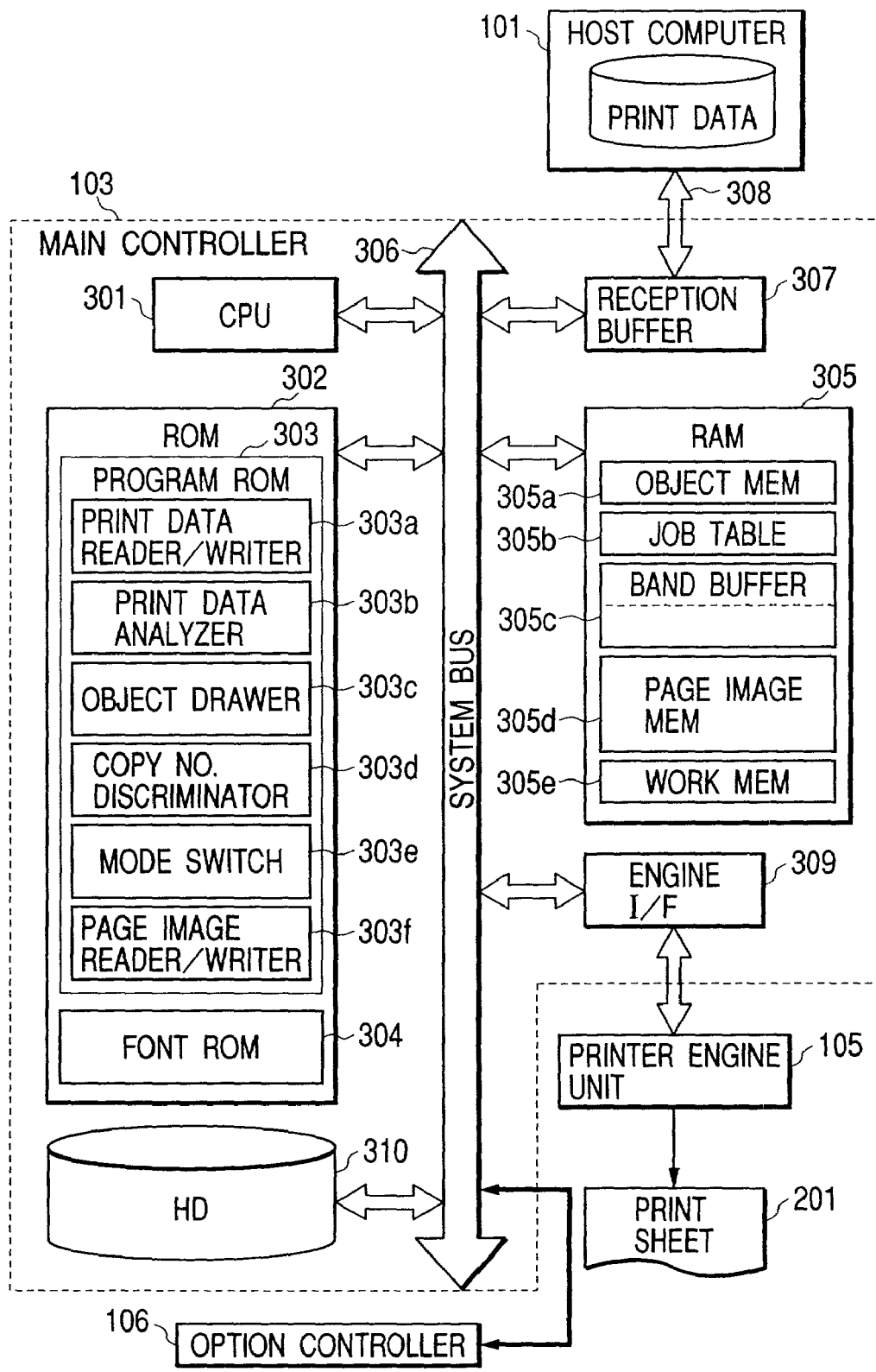
FIG. 3 is a block diagram for explaining a fundamental construction of a controller of an image processing apparatus shown in the first embodiment.

FIG. 3 is a block diagram for explaining a fundamental construction of the image processing apparatus according to the first embodiment of the invention. An internal construction of the main controller 103 of the image processing apparatus in FIG. 1 is mainly shown. The invention can be also applied to either sole equipment or a system whose processes are executed through a network such as LAN or the like, as long as the functions of the invention are executed.

In the diagram, the main controller 103 of the printer is connected to the external host computer 101 through a predetermined interface 308 and executes a predetermined printing process in accordance with the print data sent from the host computer 101. The print data received from the host computer 101 is first temporarily stored as reception data into a reception buffer 307.

Reference numeral 301 denotes a printer CPU for integratedly controlling access to various devices connected to a system bus 306, on the basis of a control program 303 stored in a ROM 302 as a read only memory.

First, the print data (PDL data) stored in the reception buffer 307 is stored in a hard disk 310 by a print data reader/writer 303a and, thereafter, immediately read out. The PDL data is analyzed by a print data analyzer 303b and a draw object of at least one page is generated. That is, the print data analyzer can be also regarded as a draw object generator or a PDL translator.

Subsequently, a raster image (=page image) of one page (or one band among a plurality of divided bands) is generated by an object drawer 303c on the basis of the draw object. Further, a video signal based on ON/OFF of a bit of the raster image is outputted (the output of the video signal is referred to as "ship" hereinbelow) to the printer engine unit 105 through an engine I/F 309. The printer engine unit 105 prints an image onto a print sheet (recording paper) 201 on the basis of the video signal received from the CPO 301.

According to a banding system such that a plurality of (for example, two) band rasters obtained by dividing a page into a band shape are prepared and a print is performed, the generation of the raster image and the shipping operation are simultaneously performed. That is, while one of the drawn band rasters is shipped, a draw object belonging to the other is drawn.

Besides the generation of the draw object, the print data analyzer 303b also executes a process for detecting the start/end of a print job and generating/releasing a job table (which will be explained below) for managing each job under processing or a process for sending an instruction to the option controller 106 via the system bus for the purpose of switching the paper ejection ports, or the like.

The control program 303 is constructed as a program for realizing the following functions besides the above construction.

That is, the control program 303 comprises a copy number (No.) discriminator 303d for discriminating whether a plurality of copies have been designated in the print job or not, a page image reader/writer 303f for, when a plurality of copies have been designated in the print job, compressing a page image generated by the object drawer 303c and, thereafter, performing a storage, reading, and decompression of the compressed page image into/from the hard disk 310, and a mode switch for deciding a plural copy output mode on the basis of a discrimination result of the copy No. discriminator 303d and the presence or absence of the paper ejection option unit.

It is assumed that the information indicative of the presence or absence of the paper ejection option unit is obtained from the option controller 106. The mode switch 303e determines the copy No. mode from the following two plural copy output modes.

(Mode: a)

The second and subsequent copies are outputted by using the page image reader/writer 303f.

(Mode: b)

The sorter is used in common, the page image reader/writer 303f is not used, but only the print data reader/writer 303a, print data analyzer 303b, and object drawer 303c are used.

When the second and subsequent copies in the plural copy print in the copy No. mode (a) are outputted, the page image reader/writer 303f sequentially reads out and decompresses the page images stored in the hard disk 310 and, thereafter, ships the decompressed page images to the engine I/F 309.

The ROM 302 is also used as a memory for storing font data comprising dot fonts or scalable fonts which are used for a character output (font ROM 304).

Subsequently, reference numeral 305 denotes a RAM which functions as a main memory, a work memory, or the like of the CPU 301. A memory capacity of the RAM 305 can be expanded by an option RAM which is connected to an expansion port (not shown). The RAM 305 is used as an object memory 305a for storing a draw object generated by the print data analyzer 303b, a work memory 305e which is temporarily used by the control program 303, a band buffer 305c for storing raster images corresponding to two planes of band areas obtained by dividing one page into band-shaped regions, a page image memory 305d for temporarily storing the page images read out by the page image reader/writer 303f prior to sending them to the engine, and a job table 305b for sequentially managing the received print jobs. The RAM 305 is further used as a font cache memory (not shown) for caching the character patterns developed on the basis of the scalable data in the font memory 304, or the like.

The job table 305b comprises: a job ID, the total number of copies, and the copy No. mode which are sequentially allocated to each job; status information such as the number of outputted copies, the number of outputted pages (it is updated whenever each copy is outputted), etc.; and the like.

The work memory 305e is used when the page image reader/writer 303f compresses the page image rendered in the band buffer or reads out and decompresses the compressed page image from the hard disk 310, or is used for temporarily holding the layout information of each page, or the like.

Although the embodiment has been constructed so as to print on the basis of the banding system, it is also possible to construct the band buffer 305c as a page buffer which can hold raster images of one page and perform a drawing/shipping process by a full-paint system. Further, the embodiment can be also constructed so that the banding system and the full paint system can be switched by an instruction from the operation panel, or the like or either one of them can be also fixedly used.

An electric power is also supplied from a power source unit (not shown) to the laser beam printer 102. Although the embodiment has been described on the assumption that the print data and the page images are stored in the hard disk 310, they can be also stored in a non-volatile memory such as a flash memory, the RAM 305, or a storing device with another construction.

Although the embodiment has been described on the assumption that the apparatus constructing the invention is supplied as a program stored in the ROM, the invention is not limited to such an example but can be also constructed in a manner such that it is supplied by a medium such as floppy disk, hard disk, or the like and loaded into the RAM or the like prior to execution and, thereafter, it is executed. The invention can be also embodied by installing the control program from a storage medium such as CD-ROM, CD-R, memory card, DVD, or the like through a drive (not shown) and controlling it. Claims of the invention incorporate those cases.

Subsequently, a processing procedure for the plural copy print in the image processing apparatus with the above construction will be described hereinbelow with reference to block diagrams of FIGS. 4A and 4B, schematic diagrams of FIGS. 5A, 5B, 8, 10A, 10B and 10C, and flowcharts of FIGS. 6A, 6B and 7.

First, in FIGS. 4A and 4B, a flow of data in the plural copy print (copy No. mode: a) will be described. FIG. 4A shows a state where the first copy is being processed. FIG. 4B shows a state where the second and subsequent copies are being processed. The same component elements as those in FIG. 3 are designated by the same reference numerals.

First, when the first copy is outputted (FIG. 4A), while the print data is temporarily stored in the reception buffer 307 (arrow A), it is stored as it is into the hard disk on a unit basis of an amount of one job (arrow B). The data is read out to analyze the PDL in parallel with the above process (arrow C).

Subsequently, the draw objects, which are generated as a result of the sequential analysis of the print data, are stored in the object memory 305a (arrow C). After generating the data of one page, it is rendered in the band buffer 305c and the band images are generated (arrow D). The generated band images are sequentially compressed by a predetermined compression format such as PackBits or the like and the compressed images of one page are stored into the hard disk 310 (arrow E). At this time, each band image 402 (shown by hatched regions) is stored into the hard disk while setting the images of one page to one file (1 file=shown by a broken line). Upon outputting the images of the second and subsequent copies, they are stored together with page IDs necessary to identify the respective page images. The page ID is set to a numerical value which sequentially increases from the turn-on of a power source. The page IDs are managed so that the same ID does not simultaneously exist (a construction of the page image will be explained with reference to FIG. 9).

Subsequently, after the band images of one page were fully stored, the band images are sequentially read out (arrow F) and shipped to the engine I/F 309 (arrow G). That is, although not shown for simplicity of explanation, in case of the banding system, the output of the page images of one page is completed by repeating the data flow of D to F the number of times corresponding to the number of bands. Although the explanation has been made with respect to the case where the ship is started after completion of the storage of all of the page images of one page into the hard disk, it is also possible to construct the apparatus in a manner such that the storage (E) into the hard disk and the ship (G) are simultaneously performed every band so long as such simultaneous operations can be executed in time corresponding to a processing speed of the engine.

Figure 4A:
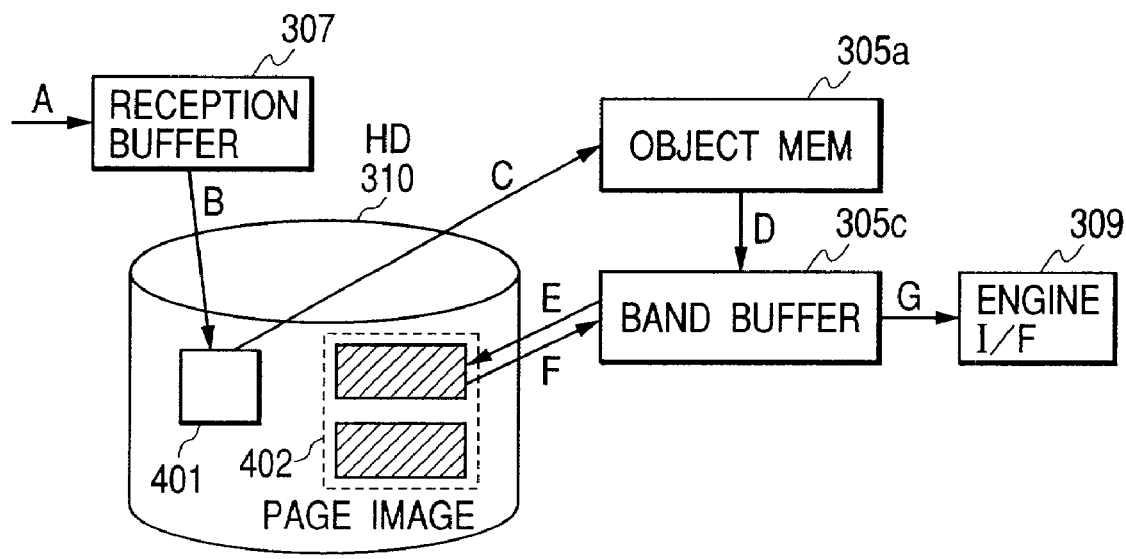
FIGS. 4A and 4B are block diagrams showing a processing procedure for a plural copy print (copy No. mode: a) in the first embodiment.

The output of the first copy is completed by repeating the processes shown in FIG. 4A until the print job is finished.

Subsequently, when the second and subsequent copies are outputted (FIG. 4B), first, the page images 402 stored in the hard disk are sequentially decompressed and read out and stored into the page image memory 305d in order of pages (page ID order) (arrow H) and outputted to the engine I/F 309 (arrow I). By outputting the page images by using the band buffer 305c and another area (305d) as mentioned above, while the second and subsequent copies are being outputted, the page images of the subsequent print job can be precedingly generated (in the case where the plural copy print has been also designated in the subsequent print job).

The shipping operation to the engine I/F 309 can be performed on a band unit basis or can be also started after all of the page images of one page were read out and stored into the page image memory 305d as in the embodiment. However, in case of performing the shipping operation on a band unit basis, the reading process from the hard disk 310 and the decompressing process have to be executed at a speed that is sufficiently higher than a paper conveying speed of the engine. In case of starting the ship after completion of the reading of the page images of one page, as a page image memory 305*d*, a capacity such that at least the page images of one page can be stored has to be prepared.

Figure 4B:
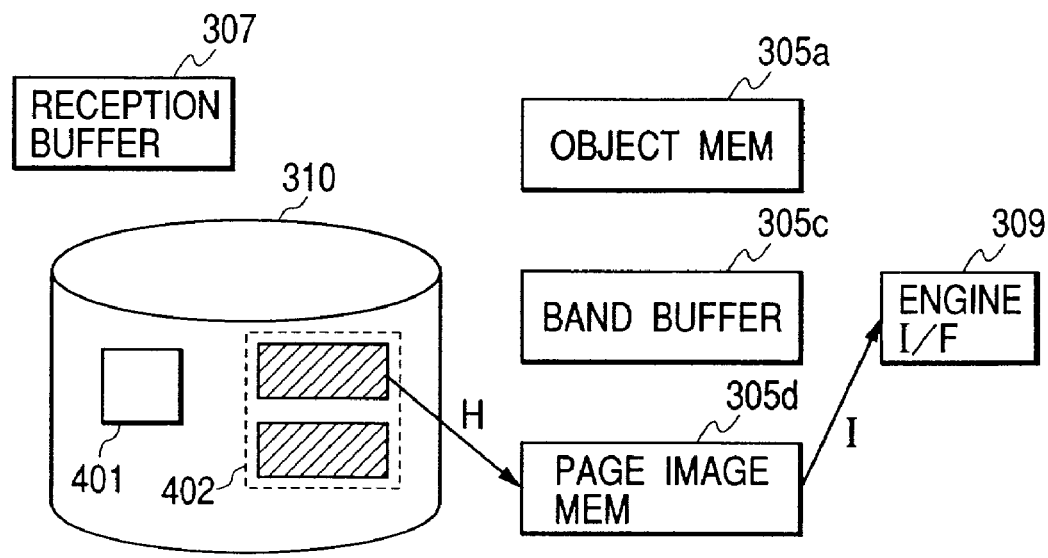

By repeating the reading process shown in FIG. 4B a number of times equal to (the number of pages of one job)×(the designated number of copies−1), the plural copy print is completed. Since the output of the first copy has been completed at the time the page images are generated, it is sufficient that the number of repetitions is set to (the designated number of copies−1).

Figure 5A:
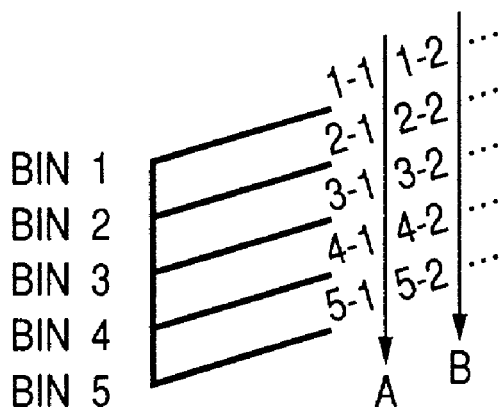
FIGS. 5A and 5B are diagrams explaining a paper ejecting order due to a difference of the plural copy print mode at the time when a sorting unit is attached.
Figure 5B:
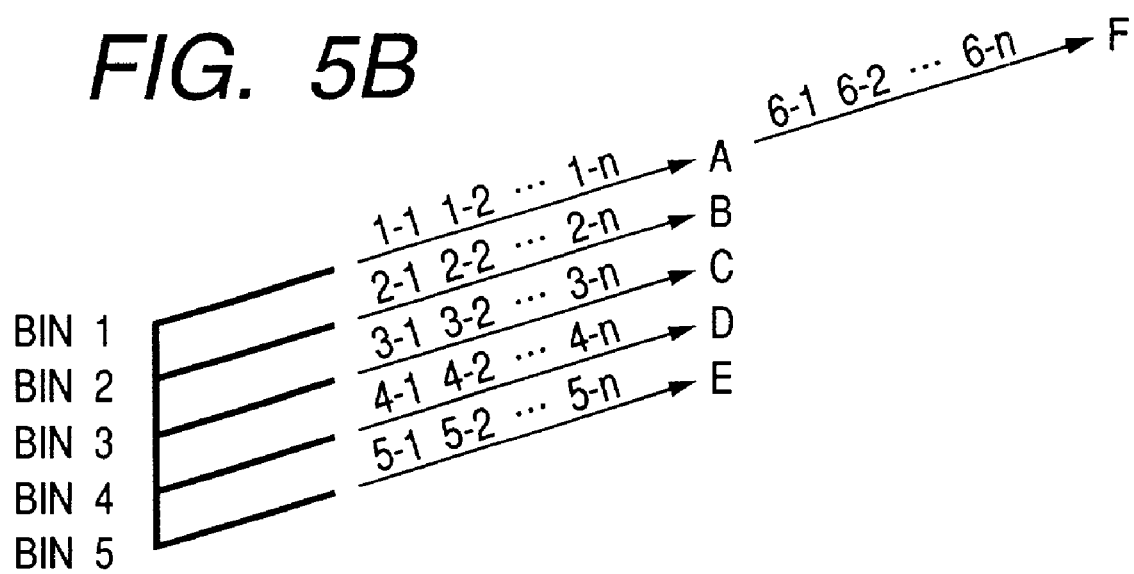

FIGS. 5A and 5B are schematic diagrams for explaining a paper ejecting order according to a difference of the plural copy print mode at the time when the sorter is attached. FIG. 5A shows the mode (b) (the mode using only the print data reader/writer 303*a*, print data analyzer 303*b*, and object drawer 303*c*; the sorter being used in common). FIG. 5B shows the mode (a) (the mode using the page image reader/writer 303*f*).

An explanation will be made on the assumption that the sorter in the embodiment has five paper ejection bins (bin 1 to bin 5) and can sort up to five copies at once. In the diagrams, the copy and each page are described as "copy-page" and it is assumed that "2-3" denotes page 3 of the second copy. Further, an outputting order of the sheets is shown by arrows (order of A, B, C, . . . , F).

First, in the mode (b) shown in FIG. 5A, the copies of the designated number of copies of the same page are outputted at once. That is, after five copies of the first page were outputted in order of 1-1, 2-1, 3-1, 4-1, and 5-1 (arrow A), the copies are subsequently outputted in order of the second page (arrow B), the third page, . . . . At this time, if the number of copies is equal to or less than 5, the analysis of the PDL data and the generation of the draw objects are executed only once. In case of outputting every five copies, the same draw object is rendered and shipped five times, thereby realizing the invention (namely, those processes are similar to those of the conventional page copy and the highest throughput of the printer engine can be maintained).

The distribution to each face-down paper ejection port (switching of the paper ejection ports) is performed by driving the bin flappers 281 to 286 at predetermined timings every page in accordance with an instruction from the option controller 106. In case of outputting five or more copies in the mode (b) (conventional example), the analysis of the PDL is executed again every sixth copy and eleventh copy.

In the mode (a) shown in FIG. 5B, after the first copy of all pages is outputted in order of 1-1, 1-2, . . . , 1-*n* (arrow A), the copies are subsequently outputted in order of the second copy (arrow B), the third copy, . . . . At this time, although the first copy is outputted while analyzing the PDL data and storing/reading out the page images into/from the hard disk (FIG. 4A), with respect to the second and subsequent copies, since the stored page images are merely read out, it is sufficient to analyze the PDL data once irrespective of the number of copies.

Subsequently, a processing procedure for the plural copy print will now be described hereinbelow with reference to flowcharts of FIGS. 6A and 6B.

In the embodiment, it is assumed that the plural copy print is instructed by a copy No. command in the print data, and the designation of the copy No. command issued prior to a paper ejection command of the first sheet is validated. This is because when the paper ejection command of each page is received/processed (when the page image is generated), the image processing apparatus in the embodiment has to decide whether the page image is held in the hard disk or not.

Figure 6B:
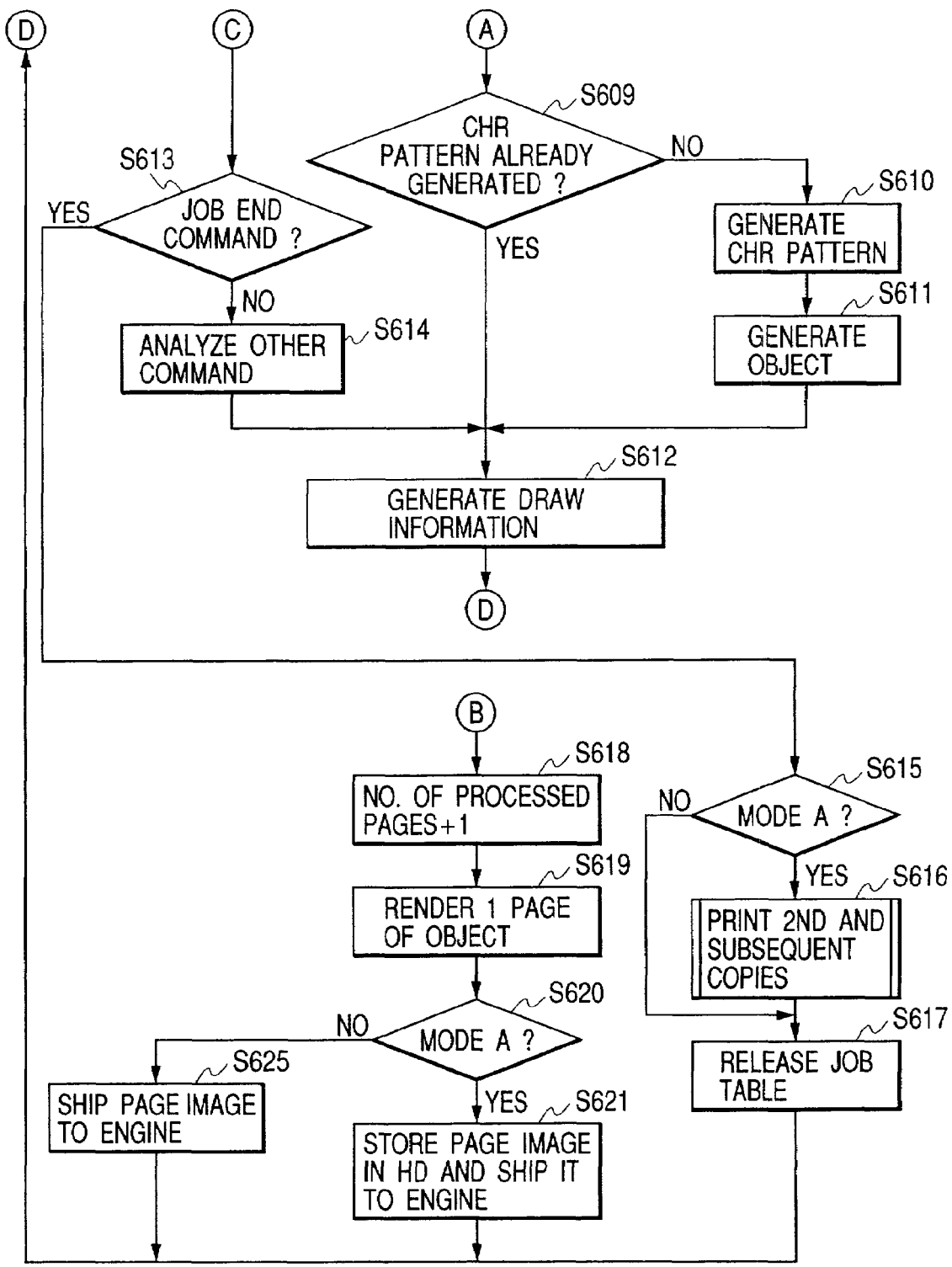
FIG. 6 which is comprised of FIGS. 6A and 6B is a flowchart showing a processing procedure (mainly, page image generating process of the first copy) of a print job in which the plural copy print is designated in the first embodiment.
Figure 7:
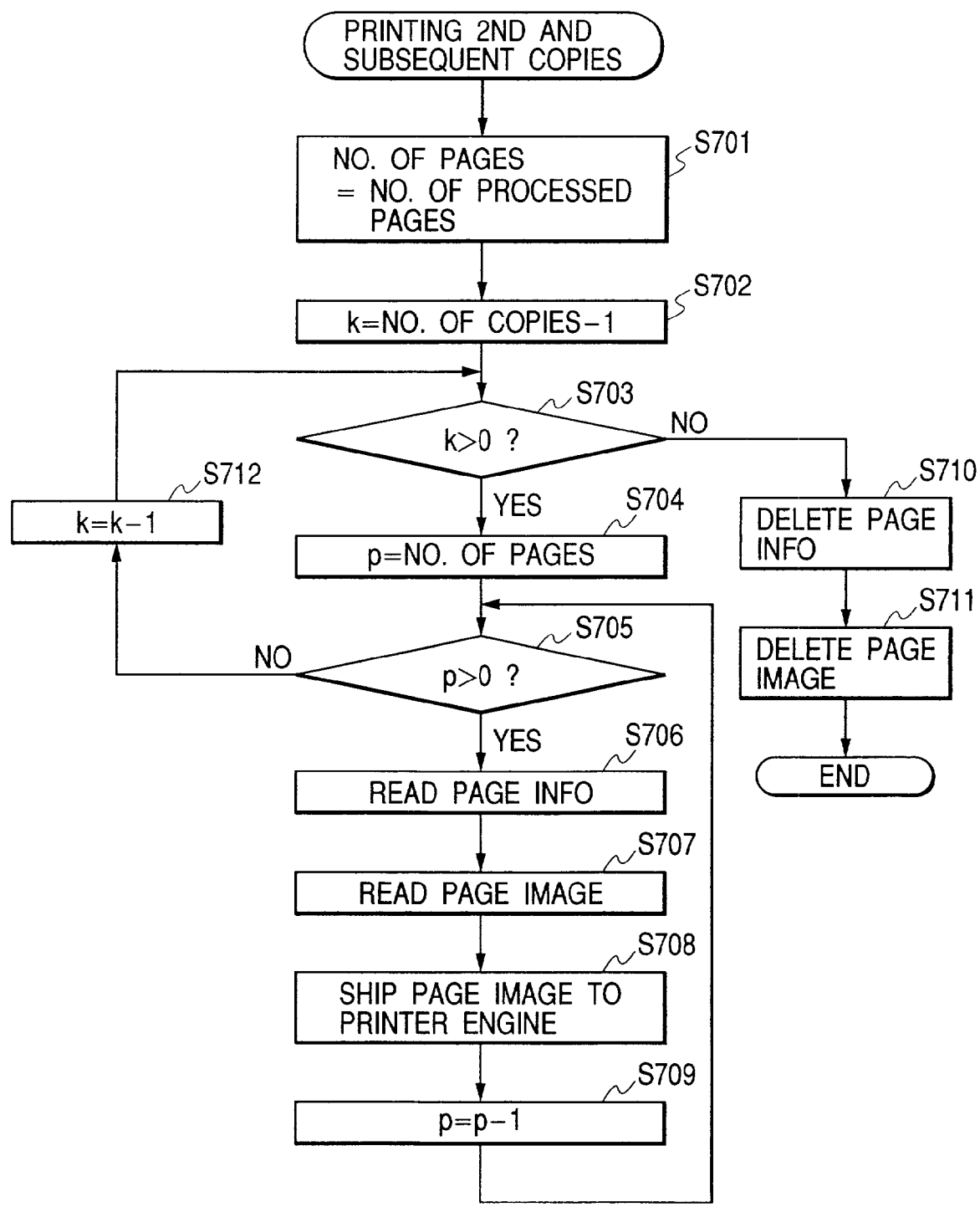
FIG. 7 is a flowchart showing a processing procedure for the second and subsequent copies in the plural copy print (copy No. mode: a) in the first embodiment.

In the flowcharts of FIGS. 6A and 6B, for simplicity of explanation, an error process which is executed in the case where there is the copy No. command after the paper ejection command of the first page or the like is omitted and an explanation will be made. It is also possible to construct the apparatus so that the number of copies can be designated from the operation panel or the like and the copies are outputted by a command other than the copy No. command.

In the flowchart, according to the control program 303, the print data sent from the host computer 101 through the predetermined interface 308 is first stored in the reception buffer 307 in step S601. Subsequently, whether the unprocessed print data exists in the reception buffer 307 or not is discriminated (step S602). If NO, the processing routine is finished.

When the unprocessed print data exists, the print data is analyzed in step S603 and subsequent steps.

First, in step S603, the print data temporarily stored in the reception buffer 307 is stored in the hard disk 310 and, at the same time, the print data analyzer 303*b* reads out the print data in order to analyze it.

In step S604 and subsequent steps, the unprocessed print data (a group of print commands of the PDL format) is sequentially analyzed. First, whether the print data is a head of the print job or not is discriminated (step S604). That is, whether the received print data is the job start command or not is discriminated. If YES, a job table is newly got (step S622). The number of processed pages is initialized to 0 (step S623). The processing routine is returned to step S601 in order to analyze the subsequent print data. The number of processed pages is referred to when the second and subsequent copies are outputted in the mode (a) (FIG. 7).

A job ID by which the print job can be unconditionally identified is given as a parameter of the job start command and stored in the job table and the hard disk together with the page image. When the second and subsequent copies in the plural copy No. mode (a) are processed, the page images are searched by the job ID. (The page images which are stored in the hard disk, and a data configuration of the page information will be described below with reference to FIGS. 8 and 9.)

If it is determined in step S604 that the received print data is not the job start command, whether the print data is the copy No. command or not is discriminated (step S605). If it is decided that the print data is the copy No. command, the designated number of copies is stored as the total number of copies into the job table 305*b*.

If it is determined in step S605 that the print data is the copy No. command, the number of copies is held in the job table and the copy No. mode is decided (step S624). That is, if the sorter is not attached or the number of copies is larger than a reference value 5, the copy No. mode is set to (a), otherwise, the copy No. mode is set to (b). (The copy No. mode is also held in the job table).

The number of paper ejection bins which the printer engine unit 105 has can be also used as a reference value. It is more suitable if outputs of the paper ejection empty detecting sensors and paper ejection stack amount detecting sensors are analyzed, the valid paper ejection bins which can be used are discriminated, and the number of valid paper ejection bins is used as a reference value.

By setting the copy No. mode (b) as an initial value at the time of getting the job table (step S622), the copy No. mode is all handled as (b) in case of the print job which is not accompanied with the copy No. command or the case where 1 is designated as the number of copies.

If it is determined in step S605 that the print data is not the copy No. command, whether it is a paper ejection command (form feed code) or not is subsequently discriminated (step S606). If NO, it is regarded that the print data is another print command and the analysis is continued in step S607 and subsequent steps. In the embodiment, the case of a character print command has been described as an example of a draw command and the description of the other commands is omitted in mass (those page analyzing procedures can be similar to the existing analyzing procedure of the page description language).

If the print command is not the paper ejection command, first, whether the print command is the character print command or not is discriminated in step S607. If NO, whether the print command is a job end command or not is discriminated in step S613. If it is not the job end command, the print command is regarded as another print command for figure drawing or the like, and a suitable object is generated, and if it is a print position shift command or the like, predetermined draw information is updated (step S614).

If it is the job end command, whether the copy No. mode has been set to (a) or not is discriminated in step S615. If NO, a process for releasing the job table is performed (step S617). The processing routine is returned to step S601 in order to process the subsequent print job. If the copy No. mode is set to (a) in step S615, a copy end flag (which will be explained below) is written as page information into the hard disk and, thereafter, step S616 follows in order to output the remaining copies of the second and subsequent copies. (A process in step S616 will be described in detail below with reference to FIG. 7). In a general system which can perform multitask processes, it is also possible to construct the system in such a manner that the outputting process of the second and subsequent copies and the analyzing process of the foregoing print data (of the next job) can be performed in parallel.

If the print data is the character print command in step S607, whether the same character pattern has been generated in a font cache memory is searched (steps S608 to S609). If it is determined in step S609 that the character pattern has already been generated, namely, if the search has been hit, draw information necessary to draw the generated character pattern is generated as a font cache (step S612).

That is, the draw object is not newly generated but only information such as a print position or the like that is necessary for rendering is generated. If the same character pattern is not found in step S609, a font scaler generates the character pattern corresponding to the designated character code of a current font (step S610). The draw object is generated (step S611). In the embodiment, although the draw object indicative of the character pattern is set to the bit map pattern, the invention is not limited to it but a process for compressing by a predetermined compression format can be also performed to characters of a predetermined pattern size or smaller. Subsequently, in a manner similar to the case of hitting at the time of search, the draw information is generated and the analysis of one command is finished (the draw object and a construction of the draw information will be described with reference to FIGS. 10A to 10C).

If it is decided in step S606 that the print command is the paper ejection command, the number of processed pages is increased by "1" (step S618). The draw objects of one page are rendered and the page image is generated (step S619). That is, the draw objects of one page generated in steps S611 and S614 are drawn as a bit map image expressing the page contents on the basis of the contents in each corresponding draw information (generated in step S612) in accordance with the existing rendering system. The page image is temporarily held in the page image memory 305d.

Whether the copy No. mode has been set to (a) or not is discriminated in step S620. If it is the copy No. mode (a), the band image is compressed and stored in the hard disk 310 and, thereafter, it is shipped (step S621). After completion of the rendering of one page and the storage into the hard disk, the processing routine is returned to step S601 in order to analyze the print data of the next page.

Although the embodiment has been constructed in a manner such that after completion of the rendering of one page for simplicity of explanation, the subsequent print data is analyzed, in the image processing apparatus such as a laser beam printer or the like, usually, the rendering and the analysis of the print data can be simultaneously performed by the multitask process. Although the embodiment has been described on the assumption that after completion of the rendering of one page, the page images are stored in a lump into the hard disk, it is also possible to sequentially repeat the rendering and storage every band.

If it is determined in step S620 that the copy No. mode is not set to (a), namely, in case of the copy No. mode (b), the page images are not stored into the hard disk but only the ship to the engine is performed (step S625), and the processing routine is returned to step S601. If the number of copies is equal to or larger than 2, the engine is controlled so as to repeat the shipping process of the page images, output the images as many as the number of copies, and switch the paper ejection bins every page.

By the processing procedure described above, in case of the copy No. mode (a), each page is rendered and, at the same time, the page image and page information are spooled on the hard disk, and the processes of the first copy of the plural copy print are finished. In case of the copy No. mode (b), the output of the images as many as the number of copies is finished by the page copy using the sorter in common without storing the page images.

FIGS. 10A, 10B, and 10C are diagrams, FIG. 10A showing a memory map in the object memory 305a of one page and, and FIGS. 10B and 10C showing schematic constructions of a draw object and draw information. First, in FIG. 10A, reference numeral 1001 denotes a page information header for storing various information of each page. The header 1001 is constructed by information to be managed every page, namely, a print resolution of the page, a paper size, a color mode, the number of band rasters m, the total capacity (memory use amount) of the draw object belonging to the page, a page state (drawn/in shipping, etc.), a page ID number (page ID) of the pages which are sequentially counted from the turn-on of the power source, and the like.

The information included in the page information header section is determined from a current graphic state at a point when the process of each page is started. Assuming that a height of each band has been fixed, the number of band rasters m is determined from a paper size and a print resolution. Reference numeral 1002 denotes a band table. Bands of the number corresponding to the number of band rasters are prepared every page. Draw information 1005 corresponding to the object which is drawn in each band is linked to each band (FIG. 10B). Reference numeral 1003 denotes a draw information memory for storing the draw information 1005 of one page.

As will be described hereinbelow, each draw information 1005 shows at which position in each band and how each draw object is printed. In the following description, the draw information is called "application" (abbreviated to "APPL1"). In the embodiment, each application 1005 and a draw object 1006 are generated and held in the draw information memory 1003 and an object memory section 1004, respectively. However, they can be also mixedly held in one memory area.

FIG. 10C is a schematic diagram showing a construction of one application. The application is constructed so as to include the following information as information for drawing each draw object 1006. That is, it includes a print position (bit offset value from the upper left edge) in the band, a height of the draw object, a draw logic (AND/OR, or the like) with the band raster, background information (BG information), a head address of the corresponding draw object, an offset amount (the number of lines) showing how many draw objects should be read-skipped in the case where the draw object is drawn on the way of the band, a kind of draw object (not shown), a head address of the next application (the last of the link is set to NULL), and the like. It is now assumed that the BG information is constructed by a gray level. Upon drawing, a dither pattern corresponding to the gray level is adhered as a background of each draw object.

In the case where the draw object is drawn over a plurality of bands, such a draw object has a plurality of applications. That is, a number of applications as great as the number of drawing times are allocated. FIG. 10B shows a state where a character "A" is drawn by APPL 1 and APPL4 so as to exist over band0 and band1 and, further, drawn in bandm by APPL6. It will be understood that by tracing the linked application from band0, a bit map (APPL2) and a character "B" (APPL3) are also drawn in addition to the character "A".

It is sufficient that each piece of information in the applications mentioned above has the number of bits which can express the designated sheet at least by a designated resolution. The link between the applications or the link with the draw object is not limited to the address in the RAM but can be also the link by the ID (in this case, it is converted into the address through a prepared ID table).

To draw each draw object every band and generate a band image by the above construction, it is sufficient to sequentially read out each of the linked applications from the band table and draw the draw object in accordance with the print position information stored in each application. By repeating such processes up to a timing when the next application address becomes NULL, the drawing (rendering) process of one band is finished.

Subsequently, the page information which is stored in the hard disk in step S621 in FIG. 6 and a construction of the page image will be described with reference to FIGS. 8 and 9.

Figure 8:
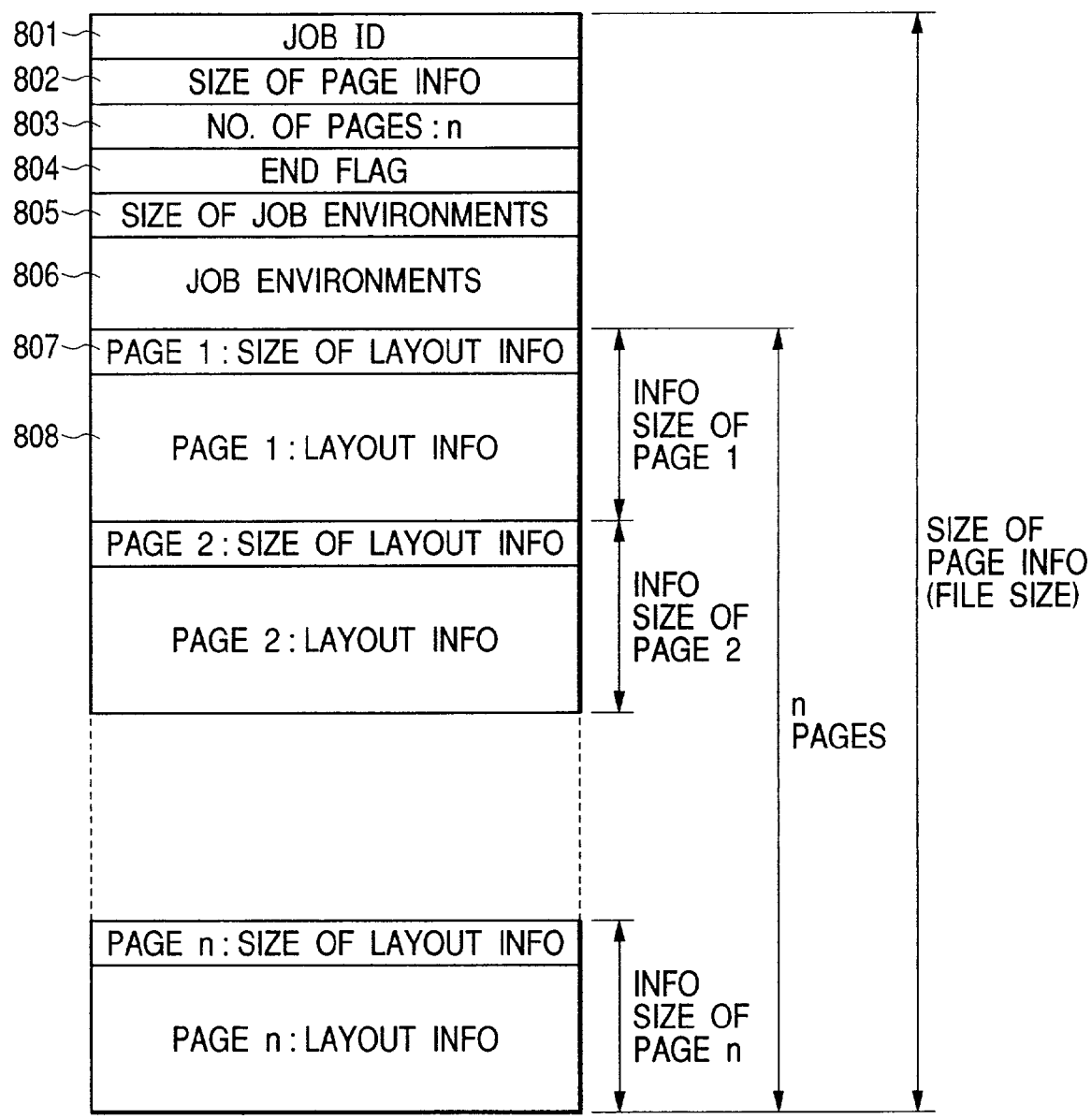
FIG. 8 is a diagram showing a data format (file format at the time when it is stored in a hard disk) of page information which is generated to the first copy in the copy No. mode (a)

FIG. 8 shows page information constructed by layout information necessary to output each page, job environments such as the total number of copies which are common between the jobs, the number of generated pages, and the like. The page information is stored as one file in the hard disk.

In the diagram, reference numeral 801 denotes a job ID for unconditionally identifying the print job; 802 denotes a size (the number of bytes) of page information; 803 denotes the number of pages n of the print job; 804 denotes an end flag which is set to "1" when the job is finished; 805 denotes a size (the number of bytes) of job environments comprising the number of copies and the like; 806 denotes job environments; 807 denotes a size (the number of bytes) of layout information of the first page; and 808 denotes layout information of the first page. (The information 807 and 808 is repetitively stored the same number of times as the number of pages.) In the case of constructing the apparatus in a manner such that the layout information of the same size between the pages is stored, the size of layout information 807 does not exist.

It is also possible to construct the apparatus in a manner such that only a memory area is preliminarily allocated to the number of pages n 803 and the number of processed pages which is increased by "1" every page in step S618 is overwritten every page, or a value is written at a point (at the time of the end of the job) when the output of all pages of the first copy has been completed. A value is also set into the size of page information 802 in a manner similar to the number of pages n.

The job ID 801 can be also omitted so long as it is constructed lest a plurality of job information is held on the hard disk. That is, a case where the analyzing process of the subsequent print jobs is not progressed during the plural copy print processing.

Further, the layout information 808 includes information (for example, a sheet size, a kind of sheet, a print resolution, a print mode (double side/single side), a binding margin and a binding direction, an instruction of a paper feed port/paper ejection port, and the like), which can change for each page. However, as layout information, there is no need to prepare all of the foregoing information. Rather, it is sufficient to prepare only the information necessary for the drawing process which is executed by each image processing apparatus to which the invention is applied. For example, in the case where the sheet size cannot be changed in one print job, it is sufficient to store the sheet size into the job environments 806.

The job environments 806 are information that is common over the whole print job and, besides the number of copies, the job environments 806 include items which are common between the pages (that is, a color mode (color/monochromatic), a print gradation, and the presence or absence of designation of the stapling). When the layout information of the first page is written into the hard disk, the job environments 806 are also output together. The layout information of the second and subsequent pages is stored as one file by additionally writing it into the same file.

Figure 9:
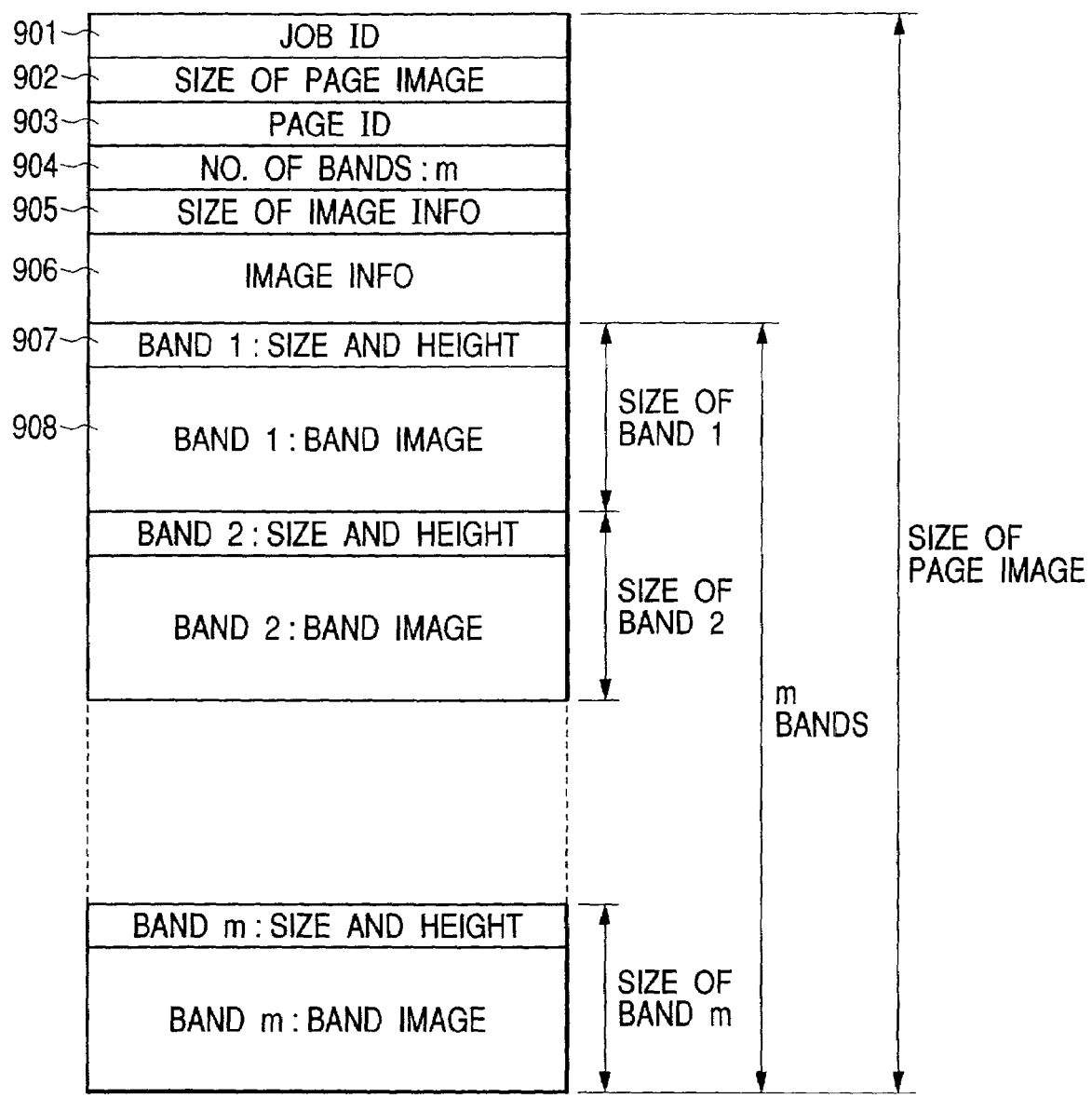
FIG. 9 is a diagram showing a data format (file format at the time when it is stored in a hard disk) of a page image which is generated to the first copy in the copy No. mode (a) and shows the page image of one page.

FIG. 9 shows a data configuration of the page image (a set of band images generated by analyzing the PDL data, rendering the draw object, and compressing the data) which is stored in the hard disk 310 in step S621 (FIG. 6B).

In the diagram, reference numeral 901 denotes a job ID similar to the job ID 801; 902 denotes a size (the number of bytes) of page image; 903 denotes a page ID for unconditionally identifying the page; 904 denotes the number of bands m included in the page; 905 denotes a size (the number of bytes) of image information 906; and 906 denotes the image information which is common in each band image. The image information 906 comprises a compression format of the band image, a sheet size, and the like. Reference numeral 907 denotes a byte size and a band height (the number of dots) of the band image of the first band; and 908 denotes a compressed band image itself. Subsequently, the band images of the same number as the number of bands m of the second and subsequent bands are sequentially stored.

The size of page image 902 is the sum of the byte size of bands 1 through m, the size of image information, and the like, and the final value is stored at the end of the job.

A file name which is unconditionally determined in the hard disk is allocated to each of the page images, thereby managing the page images in accordance with the existing disk managing method (for example, in case of page 1 of the print job having the job ID "100", the page image is identified by a file name "R100_01"), or a file name which is not directly concerned with the page ID or the like can be also allocated. In this case, however, it is necessary to read out the job ID 901 and page ID 903 from each file and examine whether the page image is a page image corresponding to a desired page or not.

Although the embodiment has been constructed so as to store the page image into a different file every page, the invention is not limited to this construction. It is also possible to store all of the page images included in the job into one file or, contrarily, store them as a different file every band.

Subsequently, a processing procedure (step S616 in FIG. 6B) of the second and subsequent copies for the print job having the copy No. mode (a) will be described with reference to a flowchart of FIG. 7.

In the diagram, first, the number of pages 803 is set with reference to "the number of processed pages" outputted until this time point (at the end of the job) in step S701. Subsequently, the number of copies "−1" is set into the number of remaining copies k (step S702).

The second and subsequent copies are outputted after that by repeating the processes in steps S703 to S709 until the value of k is equal to 0. First, in step S704, the number of pages is set to be the number of remaining pages p. The page images of one copy are output by repeating processes in subsequent steps S706 to S709 until the value of p is equal to 0.

First, the page information and page images stored in the hard disk are sequentially read out (steps S706 and S707) and the necessary layout information is set. After that, the decompressed page images are read out and stored into the page image memory 305*d* and, further, shipped to the printer engine (step S708). Subsequently, the number of remaining pages p is decreased by "1" (step S709) and the processing routine is returned to step S705 in order to process the next page. If it is determined in step S705 that p≦0, the number of remaining copies k is decreased by "1" (step S712). The processing routine is returned to step S703 in order to output the next copy.

When the output of all copies is finished (if it is decided in step S703 that k information and page images stored in the hard disk are deleted (steps S710 and S711). The processing routine of the print job is finished.

By the above processing procedure, in the print job in which the plural copy print has been designated, the page image generated upon outputting the first copy is used again at the time of outputting the second and subsequent copies and the page images are outputted.

Figure 11:
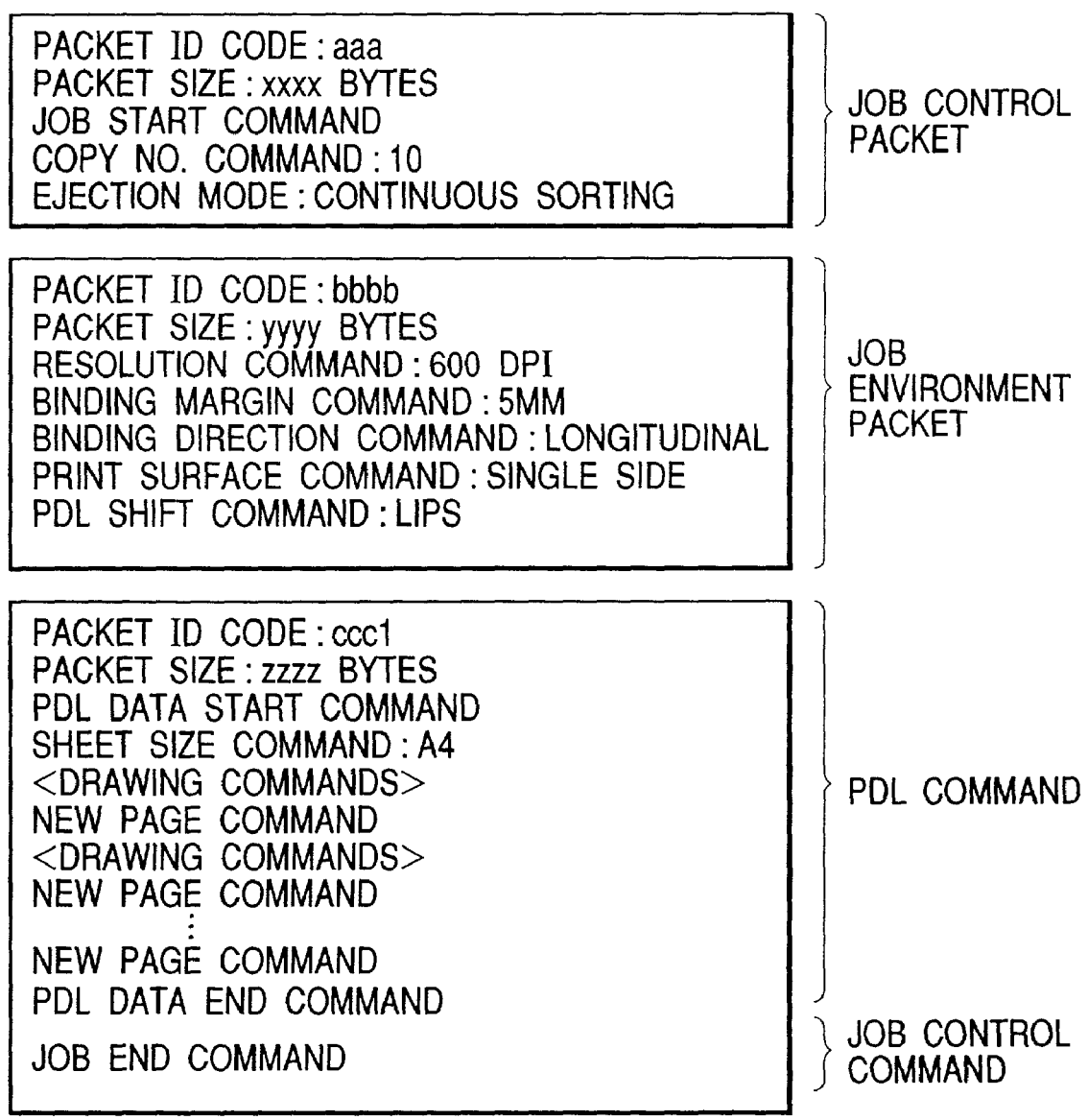
FIG. 11 is a diagram showing an example of print jobs (print commands) which are sent from a host computer to the image processing apparatus and instruct the plural copy print.

Subsequently, a construction of the print command (print job) for instructing the plural copy print from the host computer to the image processing apparatus will be described with reference to FIG. 11.

In the embodiment, the print job is constructed in a form in which it is finely divided into one or more blocks (packets). A packet ID code of a fixed size and a byte size of each packet are started at the head of the packet. The print job has been packetized by the included contents, such as a job control packet (ID code "aaaa"), a job environment setting packet (ID code "bbbb"), a PDL data packet (ID code "ccc1"), etc. As for the PDL data packet, since the data size varies depending on the output contents, a plurality of packets are usually continuously transmitted. However, the diagram shows a case where there is one PDL data packet for simplicity of explanation. The job control packet and job environment setting packet can be also constructed so as to exist over a plurality of packets. In driver software on the host computer side, it is assumed that the print data is buffered and transmitted until a size of data to be outputted is equal to a predetermined packet size.

The job control packet of the print job, in which the plural copy print has been designated, includes the following information. That is, it is constructed by:

a job start command indicative of the start of the print job,
a copy No. command (10 copies in this case),
a paper ejection mode ("continuous sorting" is fixed here), and the like.

If the job IDs shown in FIGS. 8 and 9 can be managed on the host computer side, it is also possible to construct the apparatus so as to designate the job IDs as parameters of the job start command or properly distribute them on the image processing apparatus side.

The subsequent job environment setting packet includes the following group of commands for designating various environments (job environments) which are uniform in the print job:

a print resolution command (600 dpi in the embodiment) for setting a print resolution at which the subsequent PDL data should be processed,
a binding margin command (5 mm) for designating a mapping position on the sheet of the print contents and binding direction command (longitudinal direction) when the sheets are bound,
a print surface command (single side) for designating whether the print is performed to the single side or double side of the sheet, and s
a PDL shift command (LIPS is activated) for instructing the activation of a PDL analysis processing program in order to process the print data.

Further, the subsequent PDL data packet includes the following group of commands in the PDL data format describing the draw contents of each page:

a PDL data start command indicative of the start of the PDL data,
a sheet size command (A4) for selecting the sheet size of each page,
various drawing commands for characters, figures, and the
a paper ejection (form feed) command,
a PDL data end command indicative of the end of the PDL data, and the like.

(The various drawing commands and the paper ejection commands of the same number as the number of pages to be outputted are included.)

Finally, a job end command for defining the end of the print job is added.

Second Embodiment

In the first embodiment, since the paper ejection mode is fixedly set to the continuous sorting mode and, at the time of the plural copy output, each copy is distributed to each paper ejection bin of the sorter and ejected, the mode switch 303*e* performs the switching operation on the basis of only the presence or absence of the sorter and the designated number of copies as discrimination references. However, in case of supporting a plural paper ejection mode, the paper ejection mode is added as a discrimination reference in the mode switch 303*e*.

For example, in case of a paper ejection mode, such as "stack mode," in which all of the plural paper ejection bins are regarded as one bin, a "user separating mode," in which a name is preliminarily allocated to each paper ejection bin and the sheet is ejected to the paper ejection bin having the designated name, or the like, even if the number of copies is equal to or less than the number of copies which can be sorted at once by the sorter (namely, the number of bins), the copy No. mode is set to (a), the number of analyzing times of the PDL data is certainly set to 1 and, at the same time, the data is always outputted every copy.

As described above, according to the embodiments of the invention, when the plural copy print is performed, the number of times of analysis of the PDL data is always set to only 1, irrespective of the presence or absence of equipment such as a sorter or the like, and the page images are held in the storing device such as a hard disk or the like, so that the overhead can be also minimized.

The user can always output the page images on a copy unit basis without being conscious of the presence or absence of the equipment such as a sorter or the like and the designated number of copies. Therefore, inconvenience of having the user manually rearrange the pages after completion of the output can be eliminated.

That is, if the apparatus does not have the mechanical sorter, the number of analyzing times of the PDL data can be suppressed to 1 by using the page image again irrespective of the designated number of copies.

On the other hand, if the apparatus has the mechanical sorter, only when the total number of copies to be outputted exceeds the maximum number of copies which can be sorted at once by the sorter (the number of bins), the page image is used again and the paper ejection can be performed on a copy unit basis while suppressing the number of analyzing times of the PDL data to 1. Otherwise, the plural copy print can be efficiently performed by using only the mechanical sorter without storing the page image into the hard disk.

As mentioned above, according to the invention, the print can be efficiently performed in consideration of the relation between the number of print copies and the mechanical sorter.

What is claimed is:

1. An image processing apparatus for outputting a page image corresponding to print data inputted from an external source, comprising:
    analyzing means for analyzing said print data at the time of outputting a first copy and generating a page image;
    image spooling means for holding said page image at the time of outputting the first copy;
    page image reading means for reading out said spooled page image at the time of outputting second and subsequent copies;
    mechanical sorting means for performing mechanical sorting and paper ejection every copy;
    discriminating means for discriminating whether said mechanical sorting means can be used or not and discriminating the maximum number of sorting page images which can be processed at once by said mechanical sorting means; and
    switching means for, when a plural copy print is designated, discriminating whether to execute the plural copy print by using said image spooling means and said page image reading means, or to execute the plural copy print without using said image spooling means and said page image reading means, in accordance with a discrimination result of said discriminating means and the designated number of copies.

2. An apparatus according to claim 1, wherein in the case where it is determined by said discriminating means that said mechanical sorting means cannot be used or in the case where a print of the number of copies larger than the maximum number of sorting page images which can be processed at once by said mechanical sorting means is designated, said switching means allows the plural copy print to be executed by using said image spooling means and said page image reading means.

3. An apparatus according to claim 2, wherein when a paper ejection mode is not a continuous sort, even if the print of the number of copies which is equal to or smaller than the maximum number of sorting page images which can be processed at once by said mechanical sorting means is designated, said switching means uses said image spooling means and said page image reading means.

4. An apparatus according to claim 1, further comprising:
    print data spooling means for holding said print data as much as at least one job; and
    print data reading means for reading out said print data stored in said print data spooling means a predetermined number of times,
    and wherein when said image spooling means and said page image reading means are not used, said plural copy print is performed by using said print data reading means.

5. An apparatus according to claim 4, wherein in the case where said mechanical sorting means can be used, said print data reading means reads out the print data each time the page images of the maximum number of sorting page images which can be processed at once by said mechanical sorting means are outputted.

6. An apparatus according to claim 1, wherein said image spooling means holds the page images compressed in a predetermined format.

7. An apparatus according to claim 1, wherein said page image is a set of image data obtained by dividing one page into a plurality of band-like images or image data as much as one page.

8. An apparatus according to claim 1, wherein said page image reading means outputs the page image compressed by a predetermined format while decompressing it.

9. An image processing method of outputting a page image corresponding to print data inputted from an external source, comprising:
    an analyzing step of analyzing said print data at the time of outputting a first copy and generating a page image;
    an image spool step of holding said page image at the time of outputting the first copy;
    a page image reading step of reading out said spooled page image at the time of outputting second and subsequent copies;
    a discriminating step of discriminating the maximum number of sorting page images which can be processed at once by mechanical sorting means for performing a mechanical sort paper ejection every copy; and
    a determining step of determining whether to execute a plural copy print using said page image reading step, or to execute the plural copy print without using said page image reading step, in accordance with a discrimination result in said discriminating step and the designated number of print copies.

10. A computer-readable medium which stores a program for executing an image processing method of outputting a page image corresponding to print data inputted from an external source, wherein said program comprises:
- code for executing an analyzing step of analyzing said print data at the time of outputting a first copy and generating a page image;
- code for executing an image spool step of holding said page image at the time of outputting the first copy;
- code for executing a page image reading step of reading out said spooled page image at the time of outputting second and subsequent copies;
- code for executing a discriminating step of discriminating the maximum number of sorting page images which can be processed at once by mechanical sorting means for performing a mechanical sort paper ejection every copy; and
- code for executing a determining step of determining whether to execute a plural copy print using said page image reading step, or to execute the plural copy print without using said page image reading step, in accordance with a discrimination result in said discriminating step and the designated number of print copies.

* * * * *

UNITED STATES PATENT AND TRADEMARK OFFICE
CERTIFICATE OF CORRECTION

PATENT NO. : 7,023,568 B2
APPLICATION NO. : 09/761646
DATED : April 4, 2006
INVENTOR(S) : Kiyohiro Tsunekawa It is certified that error appears in the above-identified patent and that said Letters Patent is hereby corrected as shown below:

COLUMN 2
Line 40, "an outside" should read --outside--.

COLUMN 5
Line 10, "is," should read --is--.

COLUMN 18
Line 34, "s" should be deleted.

Signed and Sealed this

Seventh Day of August, 2007

JON W. DUDAS
*Director of the United States Patent and Trademark Office*